(12) United States Patent
Aus Der Fuenten et al.

(10) Patent No.: US 10,022,009 B2
(45) Date of Patent: Jul. 17, 2018

(54) FILTER-PAPER INSERT

(71) Applicant: Melitta Europa GmbH & Co. KG, Minden (DE)

(72) Inventors: Sandra Aus Der Fuenten, Bielefeld (DE); Eduard Pertsch, Petershagen (DE)

(73) Assignee: MELITTA EUROPA GMBH & CO. KG, Minden (DE)

( * ) Notice: Subject to any disclaimer, the term of this patent is extended or adjusted under 35 U.S.C. 154(b) by 66 days.

(21) Appl. No.: 14/367,363

(22) PCT Filed: Oct. 2, 2012

(86) PCT No.: PCT/EP2012/069417
§ 371 (c)(1),
(2) Date: Jun. 20, 2014

(87) PCT Pub. No.: WO2013/091921
PCT Pub. Date: Jun. 27, 2013

(65) Prior Publication Data
US 2015/0216348 A1 Aug. 6, 2015

(30) Foreign Application Priority Data
Dec. 23, 2011 (EP) .................................. 11195667

(51) Int. Cl.
*A47J 31/08* (2006.01)
*B01D 35/02* (2006.01)
(52) U.S. Cl.
CPC .............. *A47J 31/08* (2013.01); *B01D 35/02* (2013.01)

(58) Field of Classification Search
None
See application file for complete search history.

(56) References Cited

U.S. PATENT DOCUMENTS 4,537,809 A * 8/1985 Ang ........................ B31D 1/026
156/250
5,135,710 A * 8/1992 Grattier .................... G21C 3/32
376/310

(Continued)

FOREIGN PATENT DOCUMENTS

DE 19 51 707 A1 4/1971
DE 28 02 240 A1 7/1979

(Continued)

OTHER PUBLICATIONS

Melitta, Coffee Filter 102 Original, Sep. 27, 2011, Amazon.de, pp. 1-5.*

(Continued)

*Primary Examiner* — Bobby Ramdhanie
*Assistant Examiner* — Michael J An
(74) *Attorney, Agent, or Firm* — Venable LLP; Jeffri A. Kaminski

(57) ABSTRACT

A filter-paper insert for making brewed beverages at least two layers of filter paper having a base and two opposite sides. The two layers are connected together at the base and at the two opposite sides to define an interior space that can be filled from a filling opening opposite the base. The filter paper includes a plurality of slots to increase permeability. The filter-paper insert has a lower region adjacent the base and an upper adjacent the filling opening. The lower region has fewer slots per surface area than the upper region.

15 Claims, 4 Drawing Sheets

(56) References Cited

U.S. PATENT DOCUMENTS

| | | | | | |
|---|---|---|---|---|---|
| 5,567,461 | A | * | 10/1996 | Lehrer | A23D 9/06 |
| | | | | | 210/501 |
| 5,871,644 | A | * | 2/1999 | Simon | A47J 31/08 |
| | | | | | 156/148 |
| 5,932,260 | A | * | 8/1999 | Soughan | A23F 5/267 |
| | | | | | 210/506 |
| 6,206,205 | B1 | * | 3/2001 | Durre | B01D 29/111 |
| | | | | | 210/457 |
| 2002/0066700 | A1 | * | 6/2002 | Dolfel | A47J 31/08 |
| | | | | | 210/497.3 |
| 2002/0101000 | A1 | * | 8/2002 | Dolfel | D21H 27/08 |
| | | | | | 264/156 |
| 2007/0089614 | A1 | * | 4/2007 | Tremblay | A47J 31/08 |
| | | | | | 99/495 |
| 2009/0139926 | A1 | * | 6/2009 | Hassebrauck | A47J 31/08 |
| | | | | | 210/497.3 |
| 2010/0155345 | A1 | * | 6/2010 | Al-Sannaa | B01D 35/02 |
| | | | | | 210/806 |
| 2010/0196633 | A1 | * | 8/2010 | Kuchar | D04D 9/00 |
| | | | | | 428/34.1 |

FOREIGN PATENT DOCUMENTS

| | | |
|---|---|---|
| DE | 195 16 800 A1 | 11/1996 |
| EP | 0 763 994 B1 | 7/2000 |
| EP | 2 067 420 A1 | 6/2009 |

OTHER PUBLICATIONS

International Search Report of PCT/EP2012/069417 dated Nov. 15, 2012.

* cited by examiner

FILTER-PAPER INSERT

CROSS-REFERENCE TO RELATED APPLICATIONS

This application is a U.S. National Stage of International Application No. PCT/EP2012/069417, filed Oct. 12, 2012, designating the United States and claiming priority to European Patent Application No. 11195667.8, filed Dec. 23, 2011, the priority of which is claimed herein.

BACKGROUND OF THE INVENTION

The present invention relates to a filter-paper insert for making brewed beverages, especially coffee or tea, comprising at least two layers of filter paper, which are connected at a base and at opposite side walls to each other for forming an interior space that can be filled, wherein a plurality of slots are introduced into the filter paper for increasing permeability.

European patent document EP 763 994 discloses a filter for brewed beverages, in which two layers of a fibrous filter material are provided in which pores are introduced. These pores have a small pore width of between 0.1 mm to 0.4 mm, wherein a specific fibre density is provided in a boundary region of the pores. As a result, powder particles such as coffee particles can be retained even in relatively small sizes. It is problematic with respect to these small pores however that also oil molecules are retained which have a size of between 25 to 100 μm. Such oils, especially coffee oils in the coffee beverage, are flavour carriers and the filtering of said oil molecules therefore leads to a decrease in the intensity of the coffee flavour.

European patent document EP 2 067 420 discloses a filter insert made of filter paper, in which perforations are introduced into the filter paper, wherein several regions with different permeability levels are provided. It is also problematic in this case that the small perforations not only filter the powder particles but also large oil molecules as the flavour carriers.

German patent document DE 195 16 800 discloses a filter-paper insert for making aromatic extracts of coffee or tea, in which a plurality of slots is introduced which are formed linearly by incisions. The slots can open depending on the hydrostatic pressure during the brewing process. The opening of the slots by the hydrostatic pressure leads to high permeability, so that the dwell time of the brewed water in the filter-paper insert is relatively short and coffee grounds can reach the coffee extract. Furthermore, the filter-paper insert is evenly permeable over its height with the slots arranged evenly for each unit area, so that different quantities of coffee or tea are brewed with different brewing times.

SUMMARY OF THE INVENTION

It is therefore the object of the present invention to provide a filter-paper insert for making brewed beverages in which the taste experience is optimised and the brewing times are further determined in an optimal fashion.

The above and other objects are accomplished according to the invention wherein in one embodiment there is provided a filter-paper insert for making brewed beverages, comprising: at least two layers of filter paper, having three sides, including a base and two opposite sides, the two layers being connected together at the base and at the two opposite sides to define an interior space that can be filled from a filling opening opposite the base, wherein the filter paper includes a plurality of slots to increase permeability, wherein the filter-paper insert has a lower region adjacent the base and an upper region adjacent the filling opening and wherein the lower region has fewer slots per surface area than in the upper region.

Thus, in accordance with the invention, a plurality of slots is introduced into the filter paper for increasing permeability, wherein fewer slots per surface area are arranged in a bottom region of the filter-paper insert adjacent to the base than in an upper region arranged adjacent to a filling opening. This ensures that the dwell time of the brewed water in the filter-paper insert is sufficiently long even in the case of brewing smaller quantities. As a result of the higher number of slots per unit area, it is ensured even in the case of larger quantities that the brewed water can run off when a predetermined filling level is reached in the filter-paper insert. The arrangement of the slots in the filter paper leads to the consequence that coffee grounds are held back to a substantial extent, but that the oils as the flavour carrier are rather allowed to pass. This leads to an increase in the content of coffee oil in the beverage, producing a more intense coffee flavour.

In accordance with an embodiment of the invention, the slots in the upper region may be arranged longer than in the bottom region. This leads to a further increase in the permeability in the upper region. Since the fractions of fat are lighter than water and are therefore more present in the upper region of the filter-paper insert, the content of coffee oil in the upper region is increased by the formation of the longer slots.

In one embodiment, the slots may be arranged in the manner of waves. As a result, the slots remain comparatively stable even when a hydrostatic pressure is applied to the filter-paper insert. This reduces the permeability for coffee grounds and ensures an opening size however which also allows larger oil molecules to pass. The length of the slots can be larger than 1.5 mm, especially larger than 2.5 mm. The amplitude of the wave-shaped slots can be at least 20%, preferably at least 30%, of the length of the slots. The slots can be S-shaped for example, wherein the "S" can be aligned horizontally, vertically or angularly.

A middle region may be provided, according to a further embodiment, between the upper region and the bottom region, in which more slots are provided than in the bottom region and fewer slots than in the upper region per surface area. This provides three aromatic zones on the filter-paper insert which have different permeability.

The slots may be arranged in horizontal rows for a visually appealing appearance, wherein the distance between the slots lies between 5 mm and 40 mm, especially 8 mm and 20 mm. The distance between the slots in the upper region may be smaller than in the bottom region, preferably by more than 20%. Furthermore, the slots in the bottom region can be shorter than in the upper region, preferably also by more than 20%.

In order to also separate the regions with different permeability levels visually from each other, at least the upper region and the bottom region may be separated from each other by a crimped portion. For example, frame-like crimped portions can be provided which respectively enclose the bottom, middle and/or upper region.

The filter-paper insert in accordance with the invention may allow filtering of coffee in such a way that the fraction of coffee oil after filtering is greater than 0.025%, especially greater than 0.03%. In order to determine the content of coffee oil, filtering can occur by brewing with a weight of sample material of approximately 50 g of coffee per 1100 mL of hot water. As a result, the content of coffee oil compared to conventional filter inserts is increased considerably, especially even more than doubled, which leads to an increase in the intensity of the flavour.

According to a further embodiment of the invention, at least one region of the filter paper may be crimped with a slot. The crimping can substantially be arranged in form of a pot and the slot is then formed on a base section of the crimped portion. The contour of the crimped portion can be adjusted to the contour of the slot. As a result, the extraction of the coffee oils by the crimping in the region of the slot may be optimised even further, because it has been noticed that the crimping deforms the cellulose fibres in the region of the slots under strong pressure, so that a visible bulging or pot-shaped depression is produced on one side of the filter paper. The slots situated in a base section of said crimped portion can opened even better by the crimping, so that coffee is guided in a purposeful fashion through the slots during brewing of the coffee.

The crimped portions on both layers of the filter paper may be arranged in a respectively outwardly protruding fashion. This also facilitates handling of the filter-paper insert when removing it from the package and during the opening thereof.

BRIEF DESCRIPTION OF THE DRAWINGS

The invention is explained below in closer detail by reference to several embodiments shown in the enclosed drawings, wherein.

DETAILED DESCRIPTION OF THE INVENTION

Figure 1:
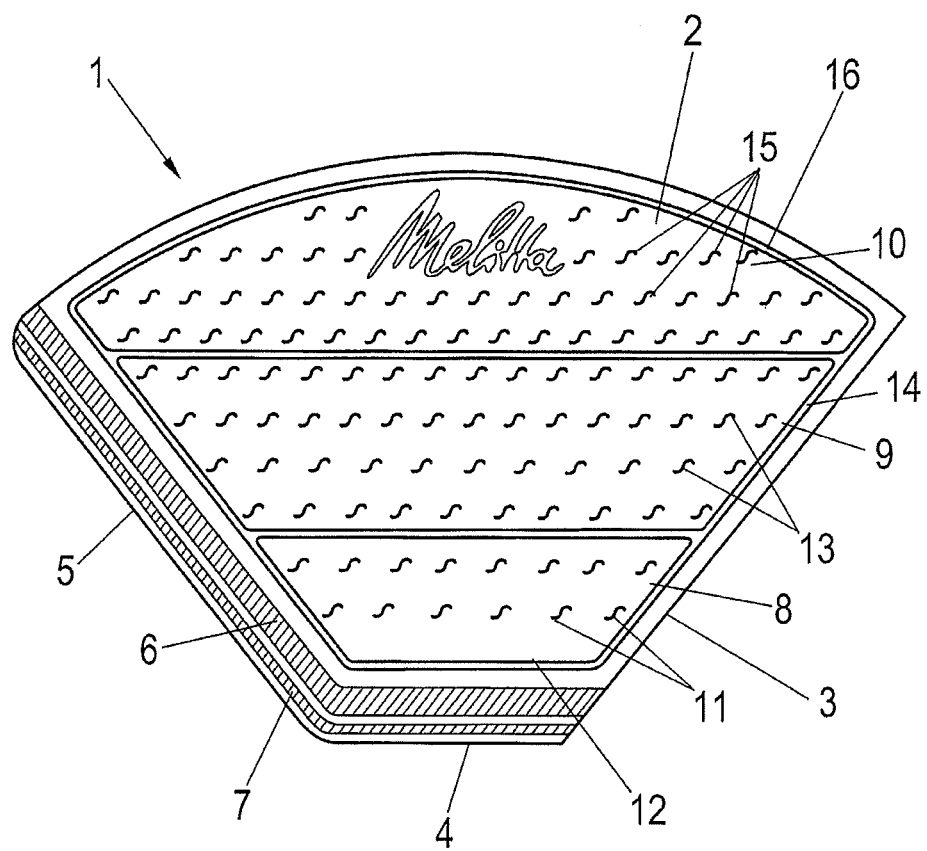
FIG. 1 shows a view of a filter-paper insert in accordance with the invention.

A filter-paper insert 1 comprises two layers 2 made of a filter paper, which may be connected on three sides to each other in order to form an interior space that can be filled. The layers may be connected to each other via a folding edge on a side 3, whereas crimping seams 6 and 7 may be provided on a base 4 and an opposite side 5, which may connect the layers 2 to each other. The filter-paper insert 1 may be substantially arranged in the manner of a truncated cone, wherein other shapes of filter-paper insert 1 can be used. Furthermore, the folding edge can also be arranged on the base instead of on one side, or it is possible to provide only one single crimping seam or more crimping seams for connecting the layers 2 instead of the illustrated crimping seams 6 and 7.

The filter paper consists of a fibrous material on cellulose basis and/or fibres made of synthetic materials, wherein reference is also made to filter paper when the material represents a mixture between a paper and a nonwoven material. The basic weight of the material lies in a range of between 20 to 100 g/m$^2$ for example.

The filter-paper insert 1 comprises a bottom region 8, which is arranged adjacent to the base 4, a middle region 9 and an upper region 10 which is arranged adjacent to a filling opening of the filter-paper insert 1. Wave-shaped slots 11 may be introduced into the filter paper in the bottom region, wave-shaped slots 13 in the middle region and wave-shaped slots 15 in the upper region, for example, by cutting in the rotation process. The length of the wave-shaped slots 11 in the bottom region 8 lies between 2.5 mm and 3.9 mm, especially 3 mm and 3.4 mm. The slots 11 may be arranged in horizontal rows and the distance between two slots may be between 10 mm and 16 mm, especially 12 mm to 14 mm. Permeability is lowest in the bottom region 8 which is used as the start-brewing zone, in order to enable swelling of the coffee grounds.

The wave-shaped slots have a length of between 3 mm and 4.6 mm, especially 3.6 mm and 4.0 mm, in the middle region 9. The slots 13 are arranged in horizontal rows, wherein the distance between two slots is 7 mm to 15 mm, especially 10 mm to 12 mm. The middle region 9 is used as the main brewing zone and the wave-shaped slots 13 ensure optimal contact time. The size of the wave-shaped slots 13 ensures that the dissolved oil molecules can pass through said slots.

Wave-shaped slots 15 with a length of between 3.5 mm to 5.1 mm, especially 4.0 mm to 4.6 mm, are arranged in the upper region 10. The slots 15 are arranged in horizontal rows, wherein the distance between the slots is between 5 mm and 13 mm, especially between 7 mm and 11 mm. The upper region 10 thus ensures rapid run-off of the brewing water. Furthermore, the rapid run-off in the upper region 10 ensures a balanced ratio of bitter substances. The oils that swim at the top during the brewing process can reach the coffee extract in an optimal fashion and are not retained by the filter-paper insert 1.

The wave-shaped arrangement of the slots 11, 13 and 15 ensures that the filter paper remains stable and the slots 11, 13 and 15 will only open to such an extent during the brewing process that coffee oil can pass through said slots, but coffee grounds are withheld substantially in the filter-paper insert 1.

A frame-like crimped portion 12 may be provided around the bottom region 8, a frame-like crimped portion 14 around the middle region 9, and a frame-like crimped portion 16 around the upper region. The regions 8, 9 and 10 are thus visually separated from each other. The frame-like crimped portions 12, 14 and 16 can also be omitted if necessary.

The effect of the wave-shaped slots 11, 13 and 15 was determined in an experiment for determining coffee oil from a coffee beverage. A filter-paper insert was used in a comparative example which has a plurality of pores in the filter paper.

In comparison thereto, a filter-paper insert 1 in accordance with the invention was used. The used filter-paper insert 1 had wave-shaped slots with a length of 3.2 mm in the bottom region, with their distance from each other being 13.0 mm. Two horizontal rows of slots 11 were provided in the bottom region 8.

Wave-shaped slots 13 with a cutting length of 3.8 mm were provided in the middle region 9. The horizontal distance between the slots 13 was 11.0 mm. Four horizontal rows of slots 13 were provided in the middle region 9.

Wave-shaped slots 15 with a length of 4.3 mm were introduced into the upper region 10. The distance between the slots 15 in the horizontal direction was 9.0 mm. Four horizontal rows of slots 15 were provided in the upper region 10, wherein the proportions substantially correspond to those shown in FIG. 1.

The fat content of the coffee brewed with hot water was determined in several tests according to the Soxhlet method:

Three different filter-paper inserts were examined in the test with respect to the coffee oil content. One filter-paper insert did not contain any pores, one filter-paper insert contained small circular pores (aroma pores), and one filter-paper insert was arranged in accordance with the invention with the wave-shaped slots, as described with respect to FIG. 1. Brewing was performed by hand for the analysis, wherein 1100 mL of boiling water were used. The boiling water was filled into a filter-paper insert with a size of 1×4 with a quantity of 48 g of ground coffee grounds.

The coffee was moistened at first with approximately 150 mL of boiling water and pre-brewed for 30 seconds. The hot water was then filled up to the upper edge of the filter-paper insert and the remaining water was added continuously.

As a result, the coffee of the filter-paper insert without any aroma pores only showed a coffee oil fraction of 0.015%, whereas the coffee filtered with the conventional filter-paper insert with aroma pores showed an average coffee oil fraction of 0.018%. In contrast to this, the fraction of coffee oil in the filter-paper insert in accordance with the invention was on average 0.037%, i.e. nearly twice as high. This is caused by the fact that coffee oil is retained in small-pore openings, whereas an increased fraction of coffee oil is allowed to pass in the filter-paper insert in accordance with the invention according to FIG. 1 by the longer slots 11, 13 and 15. This leads to a positive increase in the aroma of the coffee.

| Filter-paper insert | Combined with coffee blend | Obtained fat content in % (coffee beverage) |
| --- | --- | --- |
| Filter-paper insert WITHOUT aroma pores | Pre-ground Melitta filter coffee | 0.015 |
| Filter-paper insert with aroma pores | Pre-ground Melitta filter coffee | 0.018 |
| Filter-paper insert in accordance with the invention | Pre-ground Melitta filter coffee | 0.037 |

Figure 2:
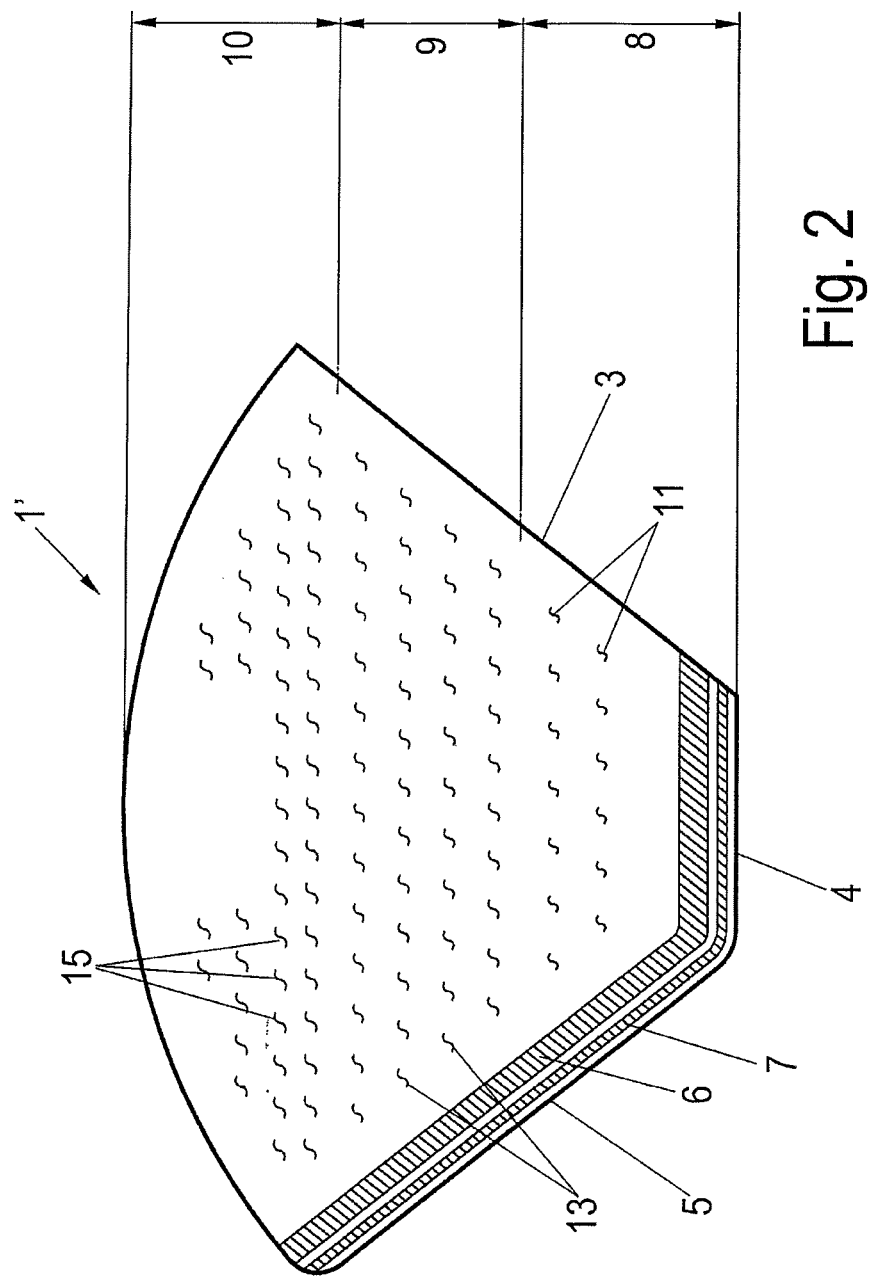
FIG. 2 shows a view of a further embodiment of a filter-paper insert in accordance with the invention.

FIG. 2 shows a modified embodiment of a filter-paper insert 1' in accordance with the invention, which has the same reference numerals for the same components as in the first embodiment. The filter-paper insert 1' is formed by two layers 2 of a filter paper, which are connected to each other at one side 3 via a folding edge and a base 4, and at one further side 5 via crimping seams 6 and 7. No further crimped portions are provided which deviate from the preceding embodiment, but only slots 11, 13 and 15 are introduced into the filter paper. The wave-shaped slots 11, 13 and 15 are provided with a shorter arrangement in a bottom region 8 than in a middle region 9, wherein the slits 13 in the middle region 9 are again arranged shorter than in an upper region 10 with the slots 15. The number of slots 11, 13 and 15 per surface area also increases from the bottom to the top, wherein both the length of the slots and also the number of the slots are increased. The filter-paper insert 1' as shown in FIG. 3 can be used in this form without any further crimped portions in order to achieve the advantages in accordance with the invention.

Figure 3:
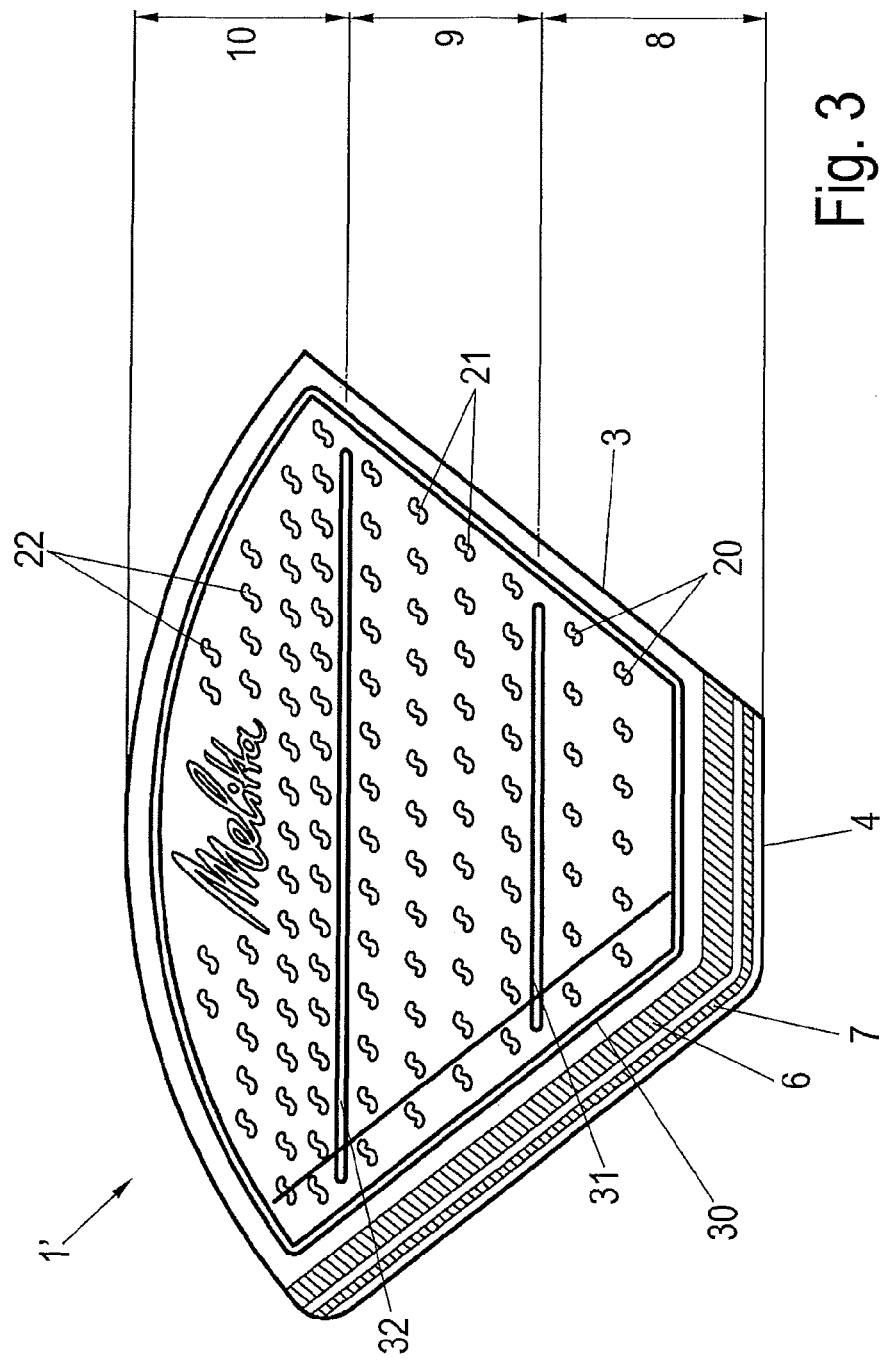
FIG. 3 shows a view of a filter-paper insert in accordance with the invention with crimped portions.

In a further embodiment, which is shown in FIG. 3, the slot arrangement shown in FIG. 3 is combined with further crimped portions, which are shown in FIG. 4. The bottom region 8 is separated from the middle region 9 by a crimping line 31, while the middle region 9 is separated from the upper region 10 by a crimping line 32. The slots are arranged in a region which is enclosed by a frame 30. The frame 30 substantially has the shape of a truncated cone and is respectively arranged at a distance from the edge 3 and the crimping seams 6 and 7.

In the embodiment as shown in FIG. 3, the slits 11, 13 and 15 are respectively arranged within a crimped portion 20, 21 and 22. The crimped portions 20, 21 and 22 can be introduced before the production of the slots 11, 13, 15, after the production of the slots 11, 13, 15, or simultaneously with the production of the slots 11, 13, 15. The crimped portions 20, 21 and 22 are arranged in the shape of waves and surround the slots 11, 13 and 15, wherein the crimped portions 20, 21 and 22 have a width of between 0.5 mm and 2 mm, especially 0.7 mm to 1.3 mm. The length of the crimped portions 20, 21 and 22 is adjusted to the length of the slots 11, 13 and 15 and preferably lies in a range of between 2 mm and 6 mm, depending on the length of the slots 11, 13 and 15.

Figure 4A:
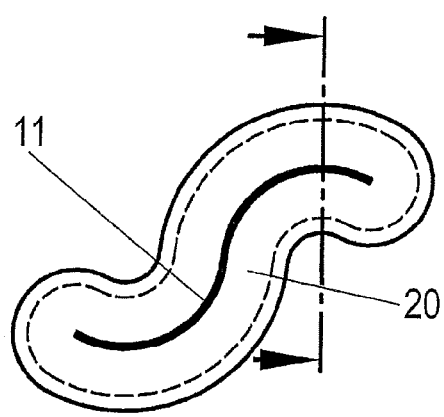
FIGS. 4A and 4B show two detailed views of a crimped portion of the filter-paper insert of FIG. 3 with a slot.
Figure 4B:
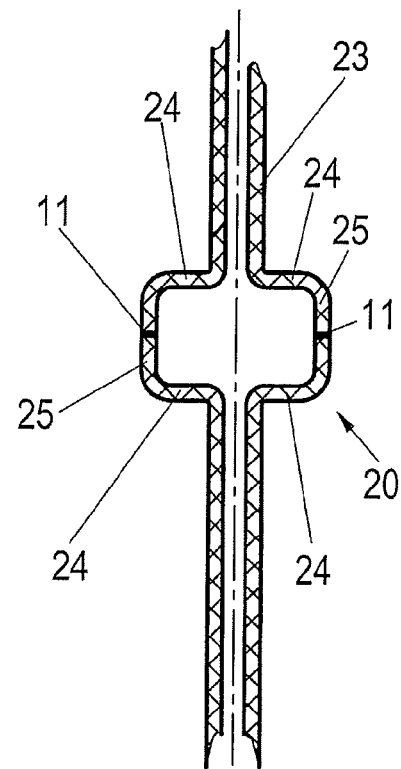

FIGS. 4A and 4B show a crimped portion 20 in a cross-sectional view, wherein the crimped portions 21 and 22 are arranged similarly and merely have a slightly larger length. The crimped portion 20 is substantially arranged in the shape of a pot in its cross-section and comprises side walls 24 which protrude from the flat filter paper 23 in a substantially perpendicular way, wherein the side walls 24 are connected to each other via a base section 25. A wave-shaped slot 11 is cut into the base section 25, wherein the slot 11 is arranged substantially centrally on the base section 25. Slots 11 and crimped portions 20 are introduced into both layers of filter paper, which respectively protrude to the outside so that adjacent filter paper inserts can be removed more easily from the package. The depth and height of the crimped portions 20, 21 and 22 can lie for example in a region of between 0.05 to 0.6 mm, especially 0.1 to 0.4 mm. The crimped portions 20, 21 and 22 ensure that the filter paper is subjected to high pressure in the crimped region under deformation, so that the slots 11, 13 and 15 can be opened more easily. As a result, the content of coffee oil in the brewed beverage can be increased even further.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. A filter-paper insert for making brewed coffee, comprising:
    at least two layers of filter paper having three sides, including a base and two opposite sides, the at least two layers of filter paper being connected together at a base and at the two opposite sides to define an interior space fillable from a filling opening opposite the base,
    wherein the at least two layers of filter paper includes a lower region adjacent to the base and an upper region adjacent to the filling opening,
    wherein the lower region and the upper region of the at least two layers of filter paper includes a plurality of slots to increase the permeability of coffee oil from the brewed coffee,
    wherein one of the slots of the plurality of slots is formed on the crimped portion of the at least two layers of the filter paper,
    wherein the crimped portion comprises sidewalls and a base section and is substantially pot-shaped,
    wherein the slot is arranged on a base section of the crimped portion; and wherein the lower region has fewer slots of the plurality of slots per surface area than the upper region.

2. A filter-paper insert according to claim 1, wherein said plurality of slots in the upper region include a longer arrangement than in the lower region.

3. A filter-paper insert according to claim 1, wherein said plurality of slots having a length, and wherein said plurality of slots are wave-shaped.

4. A filter-paper insert according to claim 1, wherein said plurality of slots having a length, wherein the length of said plurality of slots is greater than 1.5 mm.

5. A filter-paper insert according to claim 3, wherein the amplitude of said wave-shaped slots is at least 20% of said length of said wave-shaped slots.

6. A filter-paper insert according to claim 1, wherein said plurality of slots having a length, wherein the length of said plurality of slots is less than 6 mm.

7. A filter-paper insert according to claim 1, wherein at least two layers of filter paper insert includes a middle region between the upper region and the lower region, wherein the middle region includes a plurality of slots, and wherein the middle region includes more slots than the lower region and fewer slots than the upper region.

8. A filter-paper insert according to claim 1, wherein said plurality of slots having a length, wherein said plurality of slots are arranged in horizontal rows and a distance between said plurality of slots lies between about 5 mm and about 40 mm.

9. A filter-paper insert according to claim 8, wherein the distance between said plurality of slots is smaller in the upper region than in the lower region by more than 20%.

10. A filter-paper insert according to claim 1, wherein said plurality of slots in the lower region are shorter in length than in the upper region by more than 20%.

11. A filter-paper insert according to claim 1, wherein at the lower and the upper regions are separated from each by a crimped portion.

12. A filter-paper insert according to claim 7, wherein the lower, middle and upper regions are respectively enclosed by a crimped frame portion.

13. A filter-paper insert according to claim 1, wherein said plurality of slots are S-shaped.

14. A filter-paper insert according to claim 1, wherein the filter-paper insert is configured to allow filtered brewed coffee to contain a fraction of coffee oil greater than 0.025% after filtration of 50 g of coffee grounds and 1100 mL of hot water.

15. A filter-paper insert according to claim 1, wherein said at least one crimped portion protrudes outwardly from at least two layers of the filter paper.

* * * * *